United States Patent [19]
Dahllöf et al.

[11] Patent Number: 5,564,320
[45] Date of Patent: Oct. 15, 1996

[54] CUTTING TOOL FOR A BAR PEELING OPERATION

[75] Inventors: Yngve Dahllöf; Sölve Hansson, both of Sandviken, Sweden

[73] Assignee: Sandvik AB, Sandviken, Sweden

[21] Appl. No.: 257,531

[22] Filed: Jun. 9, 1994

[30] Foreign Application Priority Data

Jun. 11, 1993 [SE] Sweden .................................. 9302004

[51] Int. Cl.⁶ ...................................................... B23B 27/06
[52] U.S. Cl. .................................. 82/130; 82/158; 407/76
[58] Field of Search ............................... 82/158, 160, 161, 82/130; 407/73–76, 86, 87, 93–96; 408/153, 160–170, 179, 181

[56] References Cited

U.S. PATENT DOCUMENTS

| | | | |
|---|---|---|---|
| 3,738,767 | 6/1973 | Benjamin et al. | 408/179 |
| 4,261,235 | 4/1981 | Scholz | 82/130 |
| 5,040,931 | 8/1991 | Spivey et al. | 82/158 |

FOREIGN PATENT DOCUMENTS 0131784  1/1985  European Pat. Off. .

*Primary Examiner*—M. Rachuba
*Assistant Examiner*—Kenneth J. Hansen
*Attorney, Agent, or Firm*—Burns, Doane, Swecker & Mathis, L.L.P.

[57] ABSTRACT

A bar peeling tool includes a rotatable cutter head with circumferentially spaced cassettes. Each cassette comprises a toolholder and an adjusting device. The adjustment device comprises a setting unit provided with a protrusion which fits into an end of the toolholder. The protrusion includes a recess in which a wedge element is slidable. By sliding the wedge element, the toolholder is adjusted along a longitudinal axis of the cassette. Sliding of the wedge element is performed by means of set screws mounted in the toolholder at opposite ends of the wedge element. A clamping screw extends between the setting unit and the toolholder for clamping the wedge in the radial direction.

13 Claims, 3 Drawing Sheets

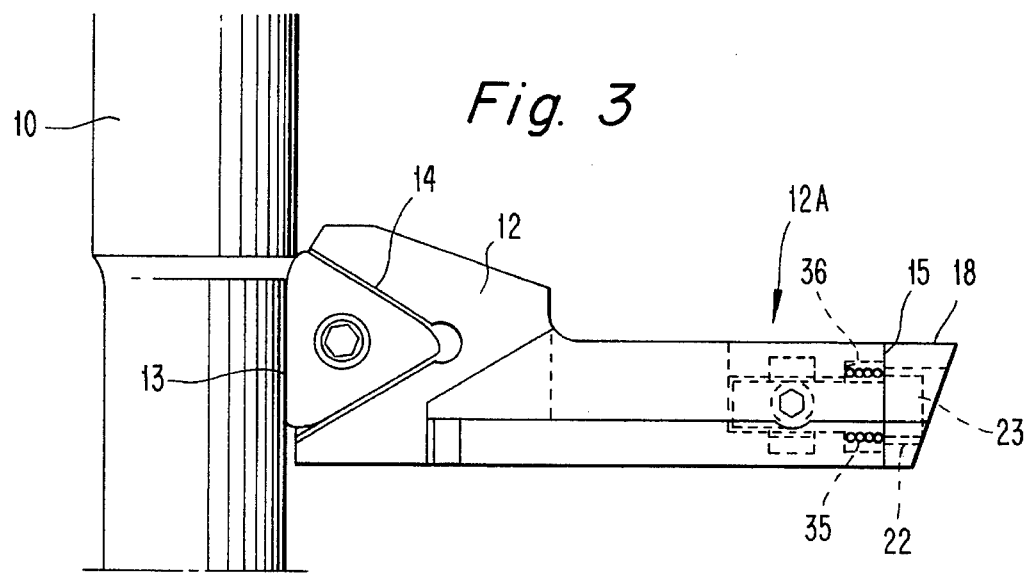
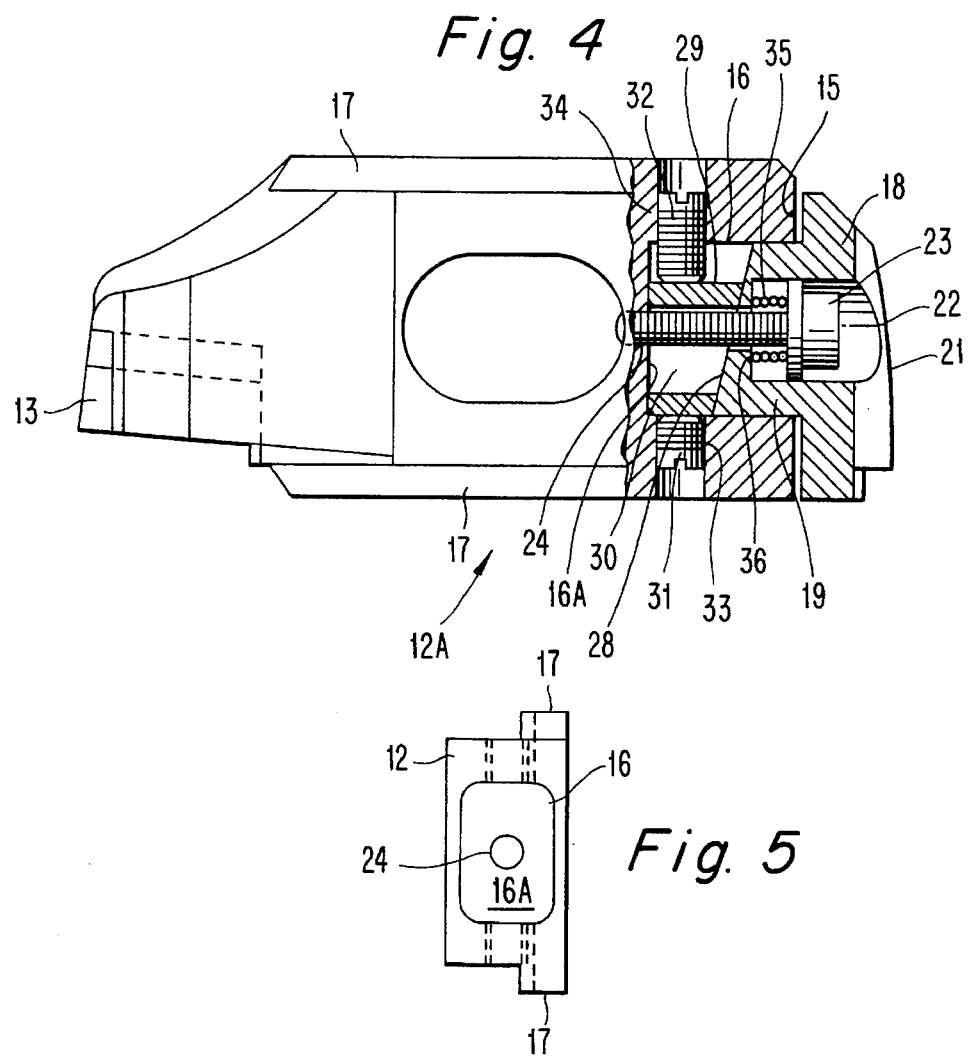

CUTTING TOOL FOR A BAR PEELING OPERATION

BACKGROUND OF THE INVENTION

The present invention relates to a cutting tool for turning operations. More specifically the invention relates to a cutting tool with an improved radial adjustment device for a bar peeling operation performed on solid or hollow bars formed of stainless steel or other heat resistant materials. The cutting tool comprises a holder equipped with one or several cutting inserts including an upper chip face, an opposite bottom face and a clearance face located therebetween, whereby the intersection of the chip face and the clearance face forms a cutting edge. Each insert is made of cemented carbide or similar wear resistant material.

Bar peeling as a metalworking operation means that an elongated bar is axially displaced through a central hole of a rotary cutter head. The cutter head is provided with several tools which remove from the bar a thin layer of millscale, surface cracks, etc., that results from the hot rolling of such slid or hollow bars. In order to achieve the best results regarding tolerances and surface finish, two different types of inserts, i.e., roughing and finishing inserts, are usually combined in the same holder.

After the mounting of the holder into its location in the rotary head cutter it is desirable to be able to make a fine adjustment of the exact radial position of each cutting insert (normally four inserts). This adjustment is usually accomplished by grinding the insert after it has been put into its location in the holder. The disadvantage of this method is that grinding the insert results in the removal of a surface layer that normally has been deposited on the surface of the insert, normally by CVD-technique, for the purpose of increasing the lifetime of the insert. Further, it is never possible to perform exactly the same amount of grinding on each of these four inserts which makes the tool less precise. According to an alternative method, precision is improved by arranging spacer plates in the toolholder for adjustment thereof. Such a procedure, however, is time-consuming and does not give precise results.

In EP-A-131 784 (the disclosure of which is incorporated by reference herein) there is disclosed a device for radial adjustment that is mounted into the holder which carries the cutting insert. This device comprises an adjustable wedge element one surface of which is in direct surface contact with a separate adjusting element. There is a large risk of vibrations with such tool, partly because the adjusting element is insufficiently dimensioned, and partly because the use of a single clamping screw is insufficient and is likely to cause a play in the tool which will lead to undesirable vibrations. (See also U.S. Pat. No. 4,261,235 which discloses a bar peeling tool having a plurality of insert holders mounted to a cutter head.)

SUMMARY OF THE INVENTION

In view thereof, it is a purpose of this invention to provide an adjusting device in the toolholder that can be easily handled and enables radial adjustment of the inserts with large precision and which can be mounted in the holder and requires a limited space.

This improved device comprises a sealed wedge device protected against dirt that can be actuated by adjusting elements, preferably setting screws from opposite sides of the holder, and which also is actuated by a clamping screw that is acting from the rear end of the toolholder. This makes it possible to accomplish fine adjustment by simple means without having to use separate fixtures in connection with the fine adjustment of the cutting insert.

BRIEF DESCRIPTION OF THE DRAWING

The objects and advantages of the invention will become more apparent from the following detailed description of a preferred embodiment thereof in connection with the accompanying drawings, and in which:

FIG. 3 is a side view of the toolholder arranged for the machining of a bar in accordance with the invention, FIG. 4 is a partially broken-away plan view of the toolholder shown in FIG. 3, FIG. 5 is an end view of the toolholder.

DETAILED DESCRIPTION OF A PREFERRED EMBODIMENT OF THE INVENTION

Figure 1:
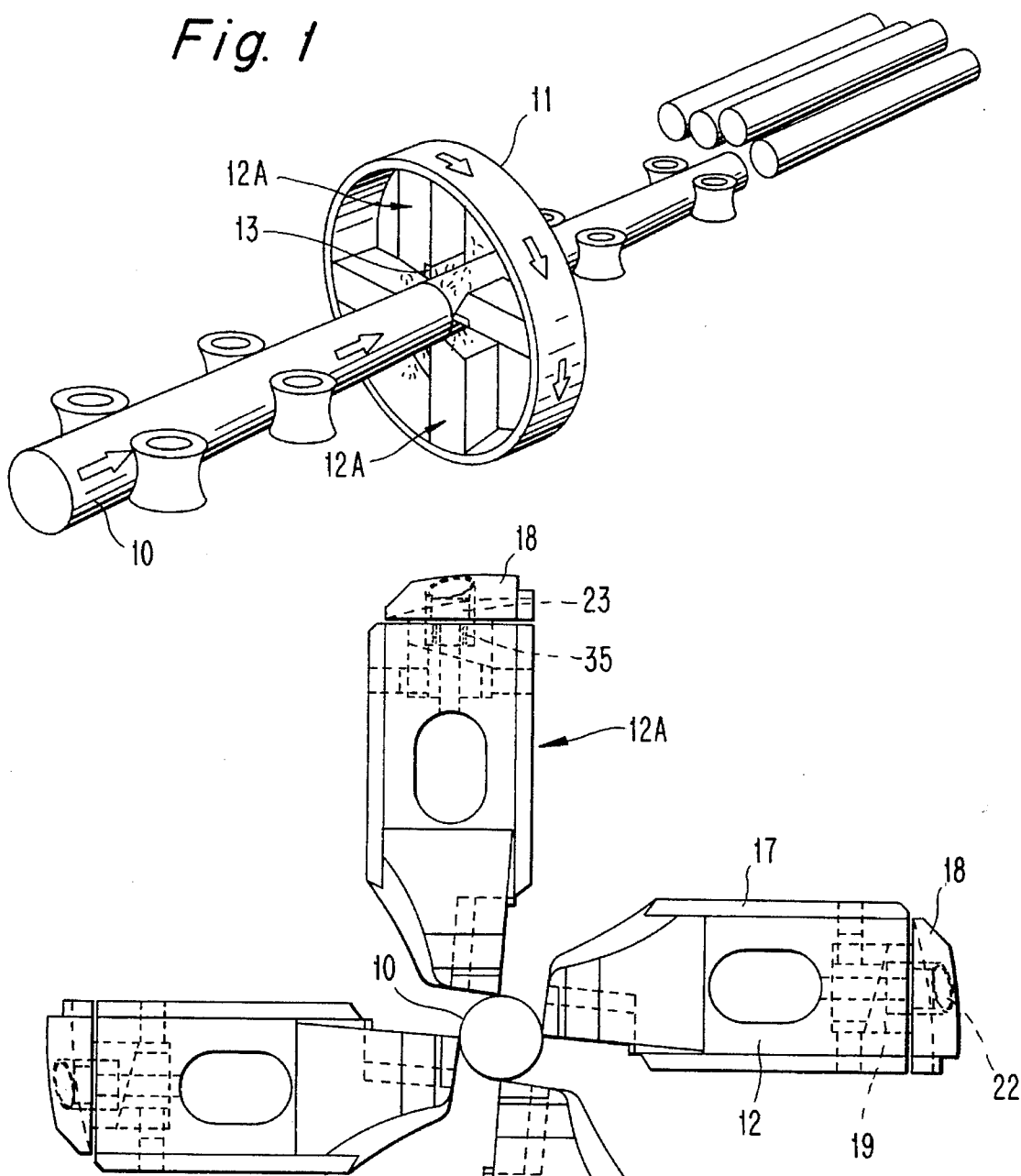
FIG. 1 is a perspective view of a conventional cutting tool for bar peeling.

In FIG. 1 there is a cylindrical bar 10, which is intended to be the subject of a bar peeling operation by a rotary cutter head 11 equipped with a plurality of radially extending holders 12, each of which is carrying one or several cutting inserts 13 of cemented carbide or similar hard and wear resistant material. The holders 12 are mounted in the cutter head in any suitable conventional manner.

Figure 2:
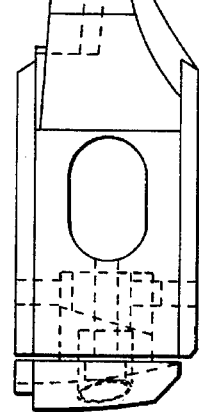
FIG. 2 is a front view of four toolholders of the invention which are oriented in same manner as shown in FIG. 1.

As appears from FIGS. 2–4 each holder 12 is at one end provided with a seat or pocket 14 for the receipt of a releasably attached cutting insert 13. The holder 12 is at its opposite remote end provided with an end surface 15 that is oriented perpendicular to the longitudinal direction of the holder 12 (which longitudinal direction is oriented with respect to the center axis of the cutter head). There is a recess 16 in the holder which extends to an end surface 15. The recess 16 terminates in a radially outwardly facing holder surface 16A. The holder 12 is T-shaped in cross section (see FIG. 5) as a consequence of the provision of longitudinally extending ridges 17 along two opposite side surfaces of the holder against which correspondingly designed guides shall be in contact when mounting the holder in a corresponding rotary bar peeling cutter head.

Figure 7:
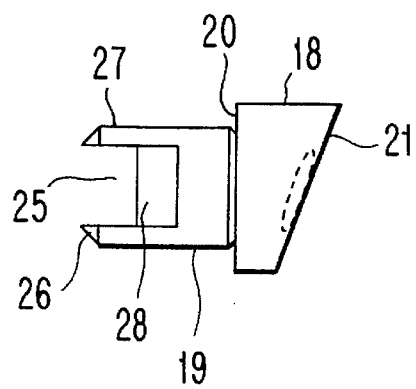
FIG. 7 is another side view of the adjusting device, oriented ninety degrees relative to the side view shown in FIG. 6.
Figure 6:
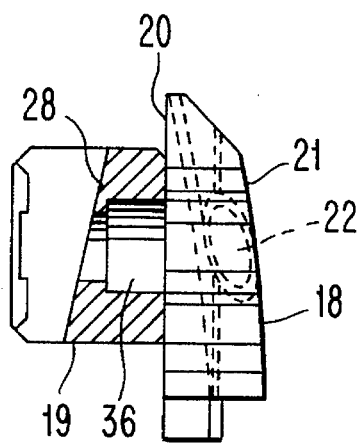
FIG. 6 is a partially broken-away side view of an adjusting device.
Figure 8:
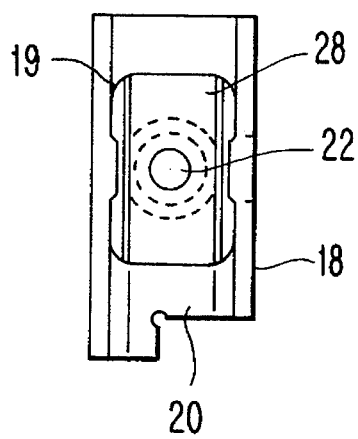
FIG. 8 is an end view of the adjusting device.
Figure 9:
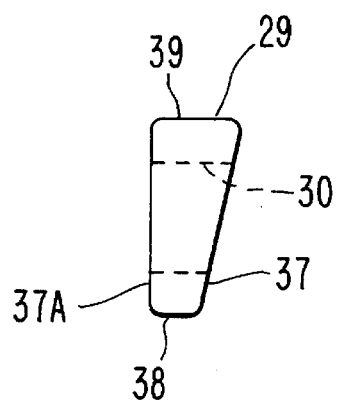
FIG. 9 is a side view of a wedge element that constitutes one portion of the invention.

The holder 12 is part of a cassette 12A which includes an adjusting device or setting member 18 for adjusting the position of the holder (and thus of the insert). The adjusting device has a central protrusion 19 (see FIG. 7) and a laterally extending (i.e., laterally with respect to the radial direction) flat surface 20 intended to abut against the corresponding flat end surface 15 of the holder while the protrusion 19 is received in the recess 16. An outer mantle surface 21 of the adjusting device 18 is convexly rounded to match a correspondingly curved surface of the cutter head in which the holder 12 is releasably attached. The adjusting device 18 has a central bore 22 for receipt of a screw 23 intended for threaded engagement with a correspondingly threaded bore 24 of the holder 12.

The protrusion 19 is in the form of a portion with rectangular cross section having a laterally extending recess 25 that is defined by two flat extensions 26, 27, the bottom of the recess being a flat wedge-supporting surface 28, or radially inwardly facing setting surface, that faces the insert-supporting end of the holder and is inclined obliquely relative to the longitudinal direction of the protrusions and against which a correspondingly designed wedge element 29 is intended to be in contact. This wedge element 29 has a smaller cross section than the protrusion 19 and is furthermore provided with a central through-hole 30 in order to accommodate lateral adjustment of the wedge element 29. In order to provide for adjustment of the wedge element 29 in the lateral direction, two laterally opposing adjusting elements in the form of setting screws 31 and 32 are screw-threadably engaged in the holder in two linearly extending bores 33 and 34, one on each side of the protrusion 19. Those screws 31, 32 are arranged to engage opposing side surfaces 38, 39 of the wedge element. The adjusting device 18 is arranged to be attached to the holder 12 by the clamp screw 23 and an associated spring 35 that is received between the head of the screw 23 and the bottom of a recess 36 provided in the protrusion 19. The wedge element includes a radially outwardly facing end surface 37 engaging the setting surface 28, and a radially inwardly facing end surface 37A engaging the holder surface 16A. The end surfaces 37, 37A extend at an angle relative to one another.

When the insert 13 is to be subjected to a radial adjustment in relation to the workpiece, in this case a cylindrical bar 10, the cassette 12A is removed from the cutter head 11 and inserted into a conventional checking device. The clamp screw 23 is first released (loosened). The set screws 31 and 32 are thereafter turned to be moved in the same lateral direction so that the wedge 29 is laterally displaced in that direction within the recess 25. This brings the end surface 37 of the wedge into abutment with the inclined bottom surface 28 of the recess 25 of the protrusion 19 thus bringing also the device 18 to a certain radial displacement relative to the holder 12. After a desirable radial displacement has been achieved by the adjusting device, the wedge 29 is locked in its position by tightening the clamping screw 23 and displacing the set screws 31 and 32 toward each other so that their end surfaces abut against the two opposite end surfaces 38 and 39 of the wedge element 29, thereby clamping the wedge element in the lateral direction. The central through-hole 30 in the wedge 29 is provided for the receipt of the clamp screw 23. The through-hole 30 is elongated in cross section in order to provide for adjustability of the wedge in the lateral direction of the protrusion 19.

After the holder (insert) has been suitably adjusted, the cassette is ready to be reinstalled in the cutter head.

Due to the design of this adjusting device it is possible to achieve high adjustment accuracy and easy handling for the operator. Further, this device requires a limited space in a tool. Also, the wedge element 29 is enclosed to be protection from dirt, etc.

Although the present invention has been described in connection with a preferred embodiment thereof, it will be appreciated by those skilled in the art that additions, deletions, modifications and substitutions not specifically described may be made without departing from the spirit and scope of the invention as defined in the appended claims.

What is claimed is:

1. A tool for bar peeling comprising:

a cutter head defining a longitudinal axis to be aligned with a bar that is to be peeled;

a plurality of holders mounted to said cuter head in circumferentially spaced relationship with said axis, each holder extending in a radial direction with respect to said axis and including a first end having an insert seat for supporting a cutting insert adjacent said axis, and a second end located outwardly of said first end in said radial direction and having a recess extending in a radial inward direction with reference to said axis, a radial inner end of said recess being defined by a radially outwardly facing holder surface of said holder; and an adjustment device for adjusting said holder radially to different positions relative to said axis, said adjustment device comprising:

a setting member attached to said cutter head and including a protrusion extending into said recess in said radial direction, said protrusion including a radially inwardly facing setting surface opposing said radially outwardly facing holder surface;

a wedge element disposed between said protrusion and said holder, said wedge element including a radially outwardly facing end surface engaging said radially inwardly facing setting surface, and a radially inwardly facing end surface engaging said radially outwardly facing holder surface, said radially inwardly and outwardly facing end surfaces extending at an acute angle relative to one another, and being movable relative to said holder and said protrusion in a direction oriented laterally with reference to said radial direction for adjusting said holder in said radial direction; and a wedge adjusting mechanism provided in said holder for adjusting said wedge element in said lateral direction, said wedge adjusting mechanism comprising first and second laterally movable adjusting elements engaging respective sides of said wedge element.

2. A tool for bar peeling comprising:

a cutter head defining a longitudinal axis;

a plurality of holders mounted to said cutter head, each holder including a first end having an insert seat for supporting a cutting insert adjacent said axis, and a second end located remotely of said axis and having a first recess extending in a radial direction with reference to said axis;

an adjustment device for adjusting said holder radially with reference to said axis, said adjustment device comprising:

a setting member attached to the cutter head and including a protrusion extending into said first recess, the protrusion including a second recess;

a wedge element disposed in said second recess in engagement with said protrusion and said holder, said wedge element including opposing side surfaces and being movable within said second recess in a direction oriented laterally with reference to said radial direction for adjusting said holder in said radial direction; and a wedge adjusting mechanism provided in said holder for adjusting said wedge element in said lateral direction, said wedge adjusting mechanism comprising first and second laterally movable adjusting elements engaging opposing surfaces, respectively, of said wedge element;

each of said first recess and protrusion having a non-circular cross section, the second recess being formed between two laterally spaced extensions of the protrusion, said second recess including a flat bottom surface which is obliquely inclined relative to the radial direction, said wedge element being slidable against said bottom surface.

3. The tool according to claim 1, wherein said second end of said holder includes a flat end surface oriented perpendicular to said radial direction, said flat end surface being engageable with an opposing flat surface of said setting member.

4. The tool according to claim 2 further including clamping means for clamping said wedge element in the radial direction.

5. The tool according to claim 4, wherein said clamping means comprises a clamp screw extending between said setting member and said holder in said radial direction, said wedge element including a through-hole for accommodating said clamp screw, said through-hole being elongated in the lateral direction to permit lateral displacement of said wedge element.

6. The tool according to claim 2, wherein said first and second adjusting elements comprise first and second colinearly arranged set screws threadedly mounted in said holder.

7. The tool according to claim 1, wherein the first recess and protrusion each have a rectangular cross section.

8. A cassette mountable in a cutter head of a bar peeling tool, said cassette comprising:

a holder including first and second ends spaced apart in a longitudinal direction, said first end having an insert seat for carrying a cutting insert, said second end having a first recess extending in said longitudinal direction;

an adjustment device comprising a setting member having a protrusion extending into said first recess, said protrusion including a second recess;

a wedge element disposed in said second recess in engagement with said protrusion and said holder, said wedge element including opposing side surfaces and being movable within said second recess in a direction oriented laterally with reference to said longitudinal direction for adjusting said holder in said longitudinal direction; and a wedge adjusting mechanism provided in said holder for adjusting said wedge element in said lateral direction, said wedge-adjusting mechanism comprising first and second laterally movable elements engaging said opposing side surfaces of said wedge element;

each of the first recess and protrusion having a non-circular cross section, the second recess being formed between two laterally spaced extensions of the protrusion, said second recess including a flat bottom surface which is obliquely inclined relative to the longitudinal direction, said wedge element being slidable against said bottom surface.

9. The cassette according to claim 8, wherein said second end of said holder includes a flat end surface of said holder oriented perpendicular to said longitudinal direction, said flat end surface being engageable with an opposing flat surface of said setting member.

10. The cassette according to claim 8 further including clamping means for clamping said wedge element in said longitudinal direction.

11. The cassette according to claim 10, further including a clamp screw extending between said setting member and said holder in said longitudinal direction, said wedge element including a through-hole for accommodating said clamp screw, said through-hole being elongated in said lateral direction to permit lateral displacement of said wedge element.

12. The cassette according to claim 8, wherein said first and second adjustment elements comprise first and second colinearly arranged set screws threadedly mounted in said holder.

13. The cassette according to claim 8, wherein the first recess and protrusion each have a rectangular cross section.

* * * * *